(12) United States Patent
Moon et al.

(10) Patent No.: US 12,432,610 B2
(45) Date of Patent: Sep. 30, 2025

(54) DEVICE AND METHOD FOR SUPPORTING TSC IN WIRELESS COMMUNICATION NETWORK

(71) Applicant: Samsung Electronics Co., Ltd., Suwon-si (KR)

(72) Inventors: Sangjun Moon, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 401 days.

(21) Appl. No.: 17/904,218

(22) PCT Filed: Jan. 14, 2021

(86) PCT No.: PCT/KR2021/000538
§ 371 (c)(1),
(2) Date: Aug. 12, 2022

(87) PCT Pub. No.: WO2021/167250
PCT Pub. Date: Aug. 26, 2021

(65) Prior Publication Data
US 2023/0077354 A1    Mar. 16, 2023

(30) Foreign Application Priority Data
Feb. 17, 2020    (KR) .......................... 10-2020-0019025

(51) Int. Cl.
*H04L 12/26*    (2006.01)
*H04W 28/02*    (2009.01)

(52) U.S. Cl.
CPC .............. *H04W 28/0268* (2013.01)

(58) Field of Classification Search
CPC ............. H04W 28/0268; H04W 28/02; H04W 56/003; H04L 41/0894; H04L 41/5051; H04L 43/0852; H04L 7/0008; H04L 47/10; H04L 47/2441; H04L 47/30; H04L 47/32; H04L 12/5693
See application file for complete search history.

(56) References Cited

U.S. PATENT DOCUMENTS 11,525,337 B2 *   12/2022   De Andrade ........... E21B 43/12
2017/0359749 A1 *  12/2017  Dao ..................... H04L 47/2416
(Continued)

FOREIGN PATENT DOCUMENTS

KR    10-1469939 B1    12/2014

OTHER PUBLICATIONS

Supplementary European Search Report dated Nov. 23, 2022, in connection with European Application No. 21757015.9, 11 pages.
(Continued)

*Primary Examiner* — Phuongchau Ba Nguyen

(57) ABSTRACT

The present disclosure relates to a 5G or pre-5G communication system for supporting a higher data transmission rate than a 4G communication system such as LTE. The present invention relates to a method for an application function (AF) entity for time sensitive communication (TSC) in a wireless communication system, the method comprising the steps of: obtaining first delay-related information on a time sensitive network (TSN); obtaining second delay-related information on a $5^{th}$ generation system (5GS); and transmitting, to a policy control function (PCF) entity, a quality of service (QoS)-related request based on the first delay-related information and the second delay-related information.

12 Claims, 14 Drawing Sheets

(56) References Cited

U.S. PATENT DOCUMENTS

| | | | | |
|---|---|---|---|---|
| 2019/0215731 | A1* | 7/2019 | Qiao | H04W 24/06 |
| 2019/0245792 | A1 | 8/2019 | Bush et al. | |
| 2021/0204172 | A1* | 7/2021 | Rost | H04L 43/026 |
| 2021/0274375 | A1* | 9/2021 | Li | H04W 28/10 |
| 2022/0030641 | A1* | 1/2022 | Wang | H04W 40/02 |
| 2022/0053381 | A1* | 2/2022 | Xiong | H04W 28/0236 |
| 2022/0322257 | A1* | 10/2022 | Moon | H04W 56/001 |
| 2022/0361120 | A1* | 11/2022 | Kim | H04W 56/001 |
| 2022/0376885 | A1* | 11/2022 | Ke | H04J 3/0673 |
| 2023/0019215 | A1* | 1/2023 | Wang | H04L 47/24 |
| 2023/0038925 | A1* | 2/2023 | Andres Maldonado | H04L 47/283 |
| 2023/0048519 | A1* | 2/2023 | Kang | H04W 56/005 |
| 2023/0300667 | A1* | 9/2023 | Baek | H04W 28/02 370/328 |
| 2024/0056869 | A1* | 2/2024 | Bae | H04W 28/24 |

OTHER PUBLICATIONS

Samsung, "[#13] Bridge Delay Time Conversion," S2-2000800, 3GPP TSG-WG SA2 Meeting #136 AH, Incheon, Korea, Jan. 13-17, 2020, 3 pages.

VIVO, "QoS mapping for uplink TSC communication," S2-1912412, A WG2 Meeting #136, Reno, USA, Nov. 18-22, 2019, 2 pages.

International Search Report and Written Opinion of the International Searching Authority dated Apr. 15, 2021, in connection with International Application No. PCT/KR2021/00538, 10 pages.

3GPP TR 23.734 V16.2.0 (Jun. 2019), Technical Report, 3rd Generation Partnership Project; Technical Specification Group Services and System Aspects; Study on enhancement of 5G System (5GS) for vertical and Local Area Network (LAN) services (Release 16), Jun. 2019, 117 pages.

Samsung, "[#1] TSCAI Time Conversion," S2-2000796, 3GPP TSG-WG SA2 Meeting #136AH, Incheon, Korea, Jan. 13-17, 2020, 3 pages.

VIVO, "Item#17: UL QoS Issue using PSFP," S2-2000131, 3GPP TSG-WG SA2 Meeting #136AH, Incheon, Korea, Jan. 13-17, 2020, 3 pages.

ZTE, "Discussion on the time conversion and TSCAI computation," S2-2000537, 3GPP TSG-WG SA2 Meeting #136AH, Incheon, Korea, Jan. 13-17, 2020, 3 pages.

Communication pursuant to Article 94(3) EPC dated Sep. 30, 2024, in connection with European Application No. 21757015.9, 11 pages.

ZTE, "Discussion on time conversion between TSN clock and 5GS clock," S2-1911909, SA EG2 Meeting #S2-136, Reno Nevada, USA, Nov. 18-22, 2019, 3 pages.

* cited by examiner

DEVICE AND METHOD FOR SUPPORTING TSC IN WIRELESS COMMUNICATION NETWORK

CROSS-REFERENCE TO RELATED APPLICATIONS

This application is a 371 of International Application No. PCT/KR2021/000538 filed on Jan. 14, 2021, which claims priority to Korean Patent Application No. 10-2020-0019025 filed on Feb. 17, 2020, the disclosures of which are herein incorporated by reference in their entirety.

BACKGROUND

1. Field

The disclosure relates to a wireless communication network and, more particularly, to a method of providing both time synchronization between terminals and time sensitive communication (TSC) through interworking between a 3GPP $5^{th}$ generation system (5GS) and a wired network supporting time sensitive networking (TSN).

2. Description of Related Art

To meet the ever increasing demand for wireless data traffic since the commercialization of 4G communication systems, efforts have been made to develop improved 5G or pre-5G communication systems. As such, 5G or pre-5G communication systems are also called "beyond 4G network system" or "post Long Term Evolution (LTE) system". To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like. Additionally, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

SUMMARY

The disclosure provides a method that supports time sensitive communication (TSC) through a 3GPP network interworking with time sensitive networking (TSN). The delay requirements for TSC traffic are provided based on the TSN clock, and to support this, the 3GPP network provides the QoS based on the 5GS clock. Due to the difference between the TSN clock and the 5GS clock, the delay requirement may be not satisfied when a 5G QoS identifier (5QI) is selected based on the TSN clock.

A method of an application function (AF) entity for time sensitive communication (TSC) in a wireless communication system according to an embodiment of the disclosure may include: obtaining first delay related information for a time sensitive network (TSN); obtaining second delay related information for a $5^{th}$ generation system (5GS); and transmitting a quality-of-service (QoS) related request based on the first delay related information and the second delay related information to a policy control function (PCF) entity.

A method of a policy control function (PCF) entity for time sensitive communication (TSC) in a wireless communication system according to an embodiment of the disclosure may include: obtaining first delay related information for a $5^{th}$ generation system (5GS) and transmitting it to an application function (AF) entity; obtaining, from the AF entity, a quality-of-service (QoS) related request based on the first delay related information and second delay related information for a time sensitive network (TSN); and determining a QoS-related policy based on the QoS-related request.

An application function (AF) entity for time sensitive communication (TSC) in a wireless communication system according to an embodiment of the disclosure may include: a transceiver; and a controller that is configured to control obtaining first delay related information for a time sensitive network (TSN), obtaining second delay related information for a $5^{th}$ generation system (5GS), and transmitting a quality-of-service (QoS) related request based on the first delay related information and the second delay related information to a policy control function (PCF) entity.

A policy control function (PCF) entity for time sensitive communication (TSC) in a wireless communication system according to an embodiment of the disclosure may include: a transceiver; and a controller that is configured to control obtaining first delay related information for a $5^{th}$ generation system (5GS) and transmitting it to an application function (AF) entity, obtaining, from the AF entity, a quality-of-service (QoS) related request based on the first delay related information and second delay related information for a time sensitive network (TSN), and determining a QoS-related policy based on the QoS-related request.

According to various embodiments of the disclosure, the 3GPP network may use delay requirements based on the 5GS clock when selecting a 5QI for TSC support, so that the delay requirements can be satisfied.

DETAILED DESCRIPTION

Hereinafter, the operating principle of the disclosure will be described in detail with reference to the accompanying drawings. In the description of the disclosure, descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, in the disclosure, terms and names defined in 5GS and NR standards, which are the latest standards defined by the 3rd Generation Partnership Project (3GPP) organization among existing communication standards, are used. However, the disclosure is not limited by the above terms and names, and may be equally applied to wireless communication networks conforming to other standards. In particular, the disclosure can be applied to 3GPP 5GS/NR ($5^{th}$ generation mobile communication standards).

Time synchronization between related nodes is required to support scenarios such as factory automation. Particularly, in a situation requiring precision work, the precision of this time synchronization must also be high. To utilize Ethernet for industrial purposes, time sensitive networking (TSN) technology, which is a method of supporting time synchronization between nodes connected through Ethernet, has been researched, commercialized, and used.

Figure 1:
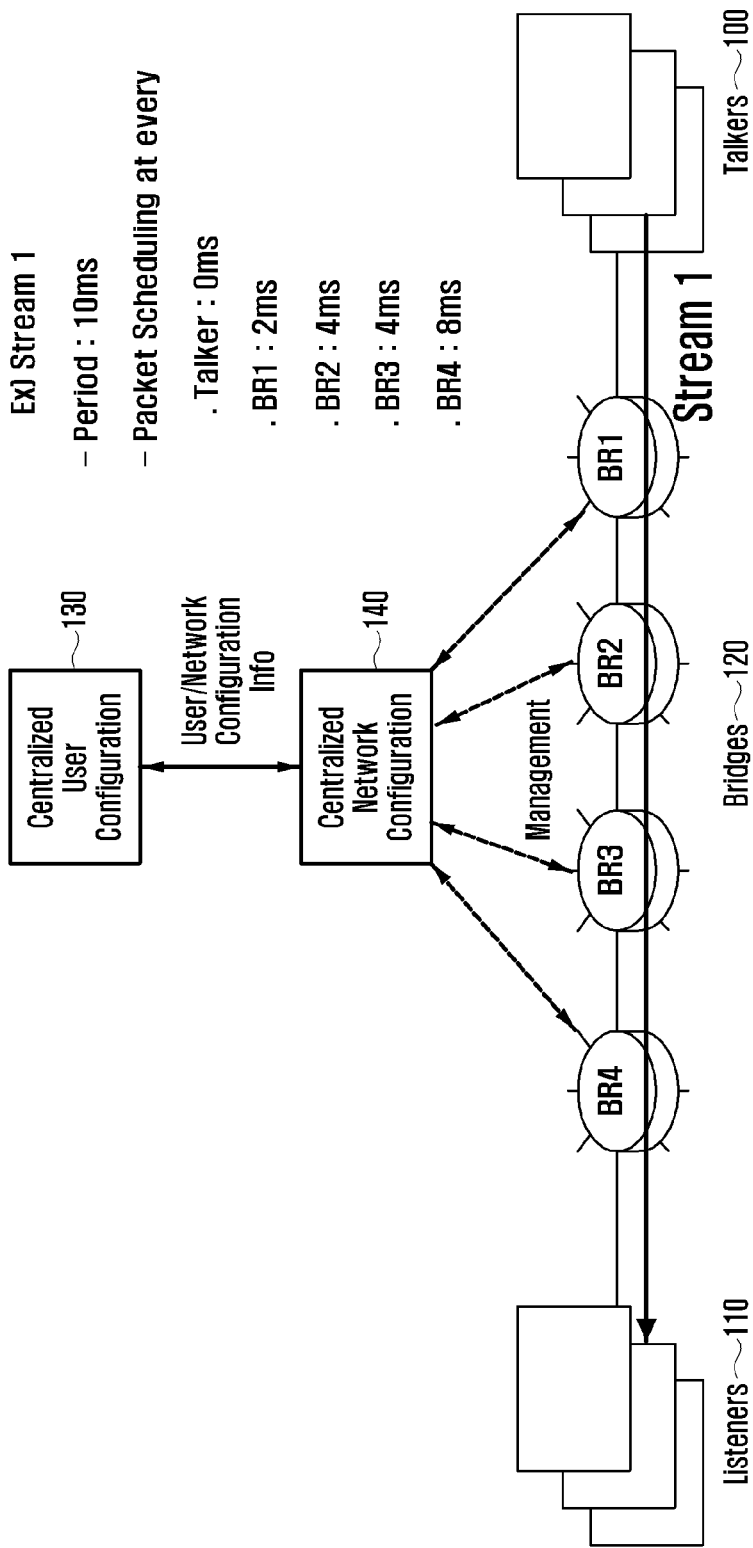
FIG. 1 is a conceptual diagram illustrating TSN management operations over Ethernet in TSN.

FIG. 1 is a conceptual diagram illustrating TSN management operations over Ethernet in TSN.

FIG. 1 depicts the principle of supporting time sensitive communication (TSC) over Ethernet in TSN. TSC traffic may be referred to as a stream because it has a characteristic of occurring at regular intervals. A node generating a stream may be referred to as a talker 100. A node receiving a stream may be referred to as a listener 110. For example, a machine tool may generate traffic reporting its operating status at regular intervals, and the management server may receive the traffic and monitor the operating status. In this case, the machine tool can be a talker and the monitoring server can be a listener. Alternatively, a robot control server may generate an operation control signal at regular intervals, and a robot may receive the control signal and operate according to the control signal. In this case, the robot control server may be a talker, and the robot may be a listener. A device for passing a stream between a talker and a listener may be referred to as a bridge (BR) 120. All nodes supporting TSN, such as talker, listener, and bridge, can operate in a clock synchronized state based on the TSN grand master (TSN GM). The centralized user configuration (CUC) 130 in TSN may transmit stream information collected from talkers and listeners to the centralized network configuration (CNC) 140. The CNC may determine a path between a talker and a listener according to a stream request, and transmit stream delivery requirements to each bridge as management information. For example, in FIG. 1, for traffic with a periodicity of 10 ms, the talker may generate and transmit traffic every zeroth ms, and the CNC can transmit management information to each bridge so that BR 1 sends traffic every $2^{nd}$ ms, BR 2 every $4^{th}$ ms, BR 3 every $6^{th}$ ms, and BR 4 every $8^{th}$ ms. In this case, it can be assumed that the link delay time between bridges is negligible. For example, BR 2 receives a stream every $2^{nd}$ ms and transmits the stream every $4^{th}$ ms, so it may have a delay requirement of transmitting the stream within a maximum delay time of 2 ms.

Figure 2:
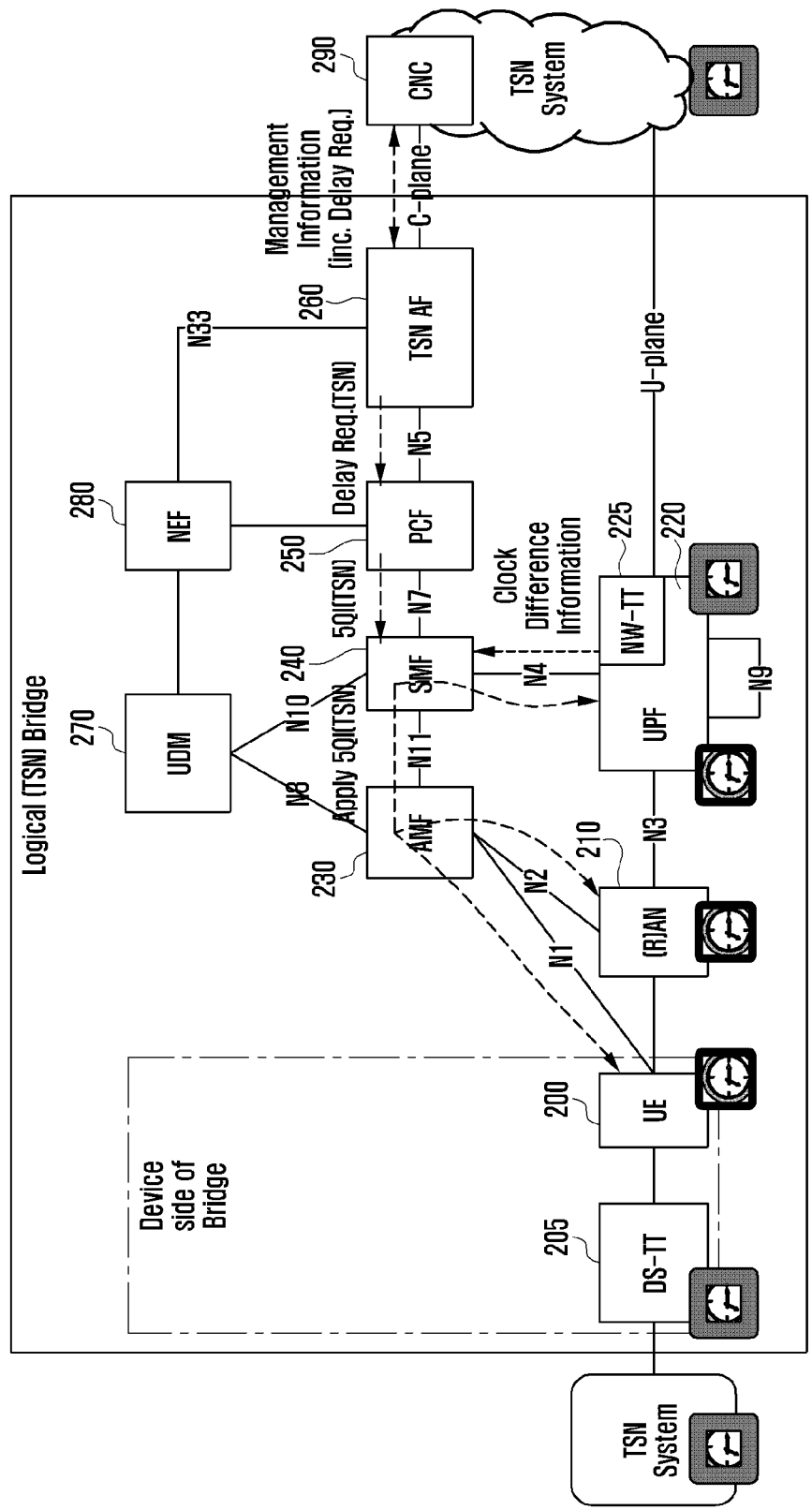
FIG. 2 is a conceptual diagram illustrating the TSN support architecture of a 5G network according to an embodiment of the disclosure.

FIG. 2 is a conceptual diagram illustrating the TSN support architecture of a 5G network according to an embodiment of the disclosure.

With reference to FIG. 2, the 5G network may support TSN clock synchronization and TSC. For example, the 5G network may be modeled as a TSN bridge (TSN node) in FIG. 1. That is, UPF (user plane function) 220—gNB (5G radio access network (RAN) base station) 210—UE (user equipment) 200 constituting the 5G network, as a single TSN node, can support TSN clock synchronization by correcting the link delay and residence time, and updating the sync frame and exchanging it with other TSN nodes. In order for the 5GS to support TSN clock synchronization, it may be assumed that the UPF 220, gNB 210, and UE 200 in the 5G network are synchronized with a common 5GS grand master (GM). The GM may be an entity that provides the reference clock to the 5GS, and may include, for example, a 5GS server/bridge connected to the GPS. For example, the gNB 210 may be connected to the GPS, the UPF 220 may be connected to the gNB through Ethernet-based TSN to be synchronized with the gNB, and the UE 200 may be synchronized with the gNB through a process of transmitting and receiving PHY frames. A logical functional block responsible for interworking between the UPF 220 and TSN may be referred to as a network-side TSN translator (NW-TT) 225, and a logical functional block responsible for interworking between the UE 200 and TSN may be referred to as a device-side TSN translator (DS-TT) 205. UPF/NW-TT 225 may be connected to a TSN node of a wired network, and UE/DS-TT 205 may also be connected to a TSN node of a wired network. Hence, the UPF 220 can know the 5GS clock and the TSN clock at the same time. The UPF 220 may transmit the session management function (SMF) 240 information about the difference between the 5GS clock and the TSN clock, which may include a clock offset and a frequency difference (rate ratio).

In addition, the 5GS as a single bridge can transmit and receive management information to and from the CNC of TSN, and TSN application function (AF) 260 is responsible for this. For example, the TSN AF 260 may receive stream information from the CNC 290 as exemplified in FIG. 1. The stream information may include delay requirements for delivering the corresponding stream in the 5GS bridge. When the TSN AF 260 changes the delay requirement and passes it to the policy control function (PCF) 250, the PCF 250 may determine a 5G QoS identifier (5QI) capable of providing the QoS that satisfies the requirement according to a predefined policy. The PCF 250 may transmit the determined 5QI and information about the corresponding stream to the SMF 240. Thereafter, the SMF 240 may deliver signaling to the UE 200, RAN 210, and UPF 220 to apply the 5QI-based QoS settings.

For example, it may be assumed that the latency requirement received from the CNC 290 guarantees a maximum of 10 ms. This requirement may be determined based on the TSN clock. In addition, it may be assumed that, among 5QIs of the PCF 250, 5QI1, 5QI2 and 5QI3 guarantee maximum delay times of 10 ms, 7 ms, and 5 ms, respectively. According to operations of FIG. 2, the PCF 250 may determine 5QI1 that satisfies a delay requirement of 10 ms based on the TSN clock and deliver 5QI1 to the SMF 240, and the SMF 240 may request a QoS setting according to 5QI1. Here, if the rate ratio (Freq TSN/Freq 5GS) between the 5GS clock and the TSN clock is 1.01, the delay requirement based on the 5GS clock can be determined as "10 ms*1/rate ratio=9.900990099009901 ms". In order for the 5G network or 5GS (5G System) to satisfy the delay requirement based on the 5GS clock, 5QI2 rather than 5QI1 may have to be selected and applied. Hence, there is a possibility that the operation of FIG. 2 may cause the 5GS to fail to meet the delay requirement of actual TSC traffic.

In addition, the unified data management (UDM) 270 in FIG. 2 may store subscriber information of the UE. The subscriber information of the UE may include a default QoS rule. The QoS rule sets available for a PDU session for the UE other than the default QoS rule may be delivered by the PCF 250 to the SMF 240. The network exposure function (NEF) 280 is used for interworking with an external AF, and it may be not used here because the TSN AF 260 can be viewed as an internal AF. However, NEF 280 may be used in a special use case where TSN requirements must be delivered to the 5GS without the TSN AF 260.

Figure 3:
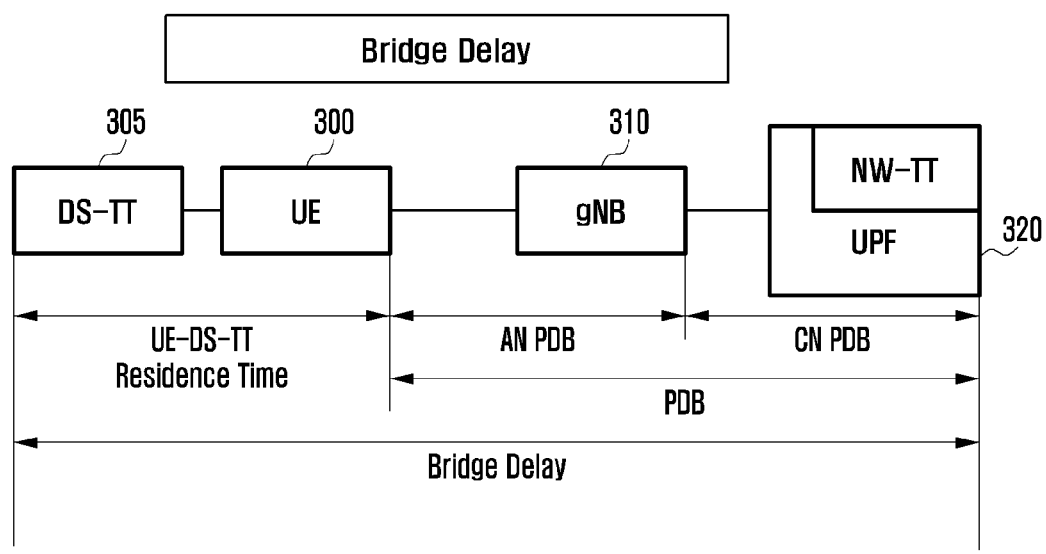
FIG. 3 is a conceptual diagram illustrating a configuration of bridge delay guaranteed by a 5G network according to an embodiment of the disclosure.

FIG. 3 is a conceptual diagram illustrating a configuration of bridge delay guaranteed by a 5G network according to an embodiment of the disclosure.

FIG. 3 shows an example of a configuration of the delay time inside a 5GS bridge. The 5GS bridge delay may include DS-TT (305)-UE (300) residence time and packet delay budget (PDB). DS-TT (305)-UE (300) residence time may be assumed to be a preset value according to the characteristics of the UE 300 and the DS-TT 305. The PDB is a QoS parameter, and may be a value that changes according to the 5QI determination. The PDB may be subdivided into CN (core network) PDB being the delay time of the section between the UPF 320 and the backhaul, and AN (access network) PDB being the delay time of the section of the RAN 310.

Figure 4:
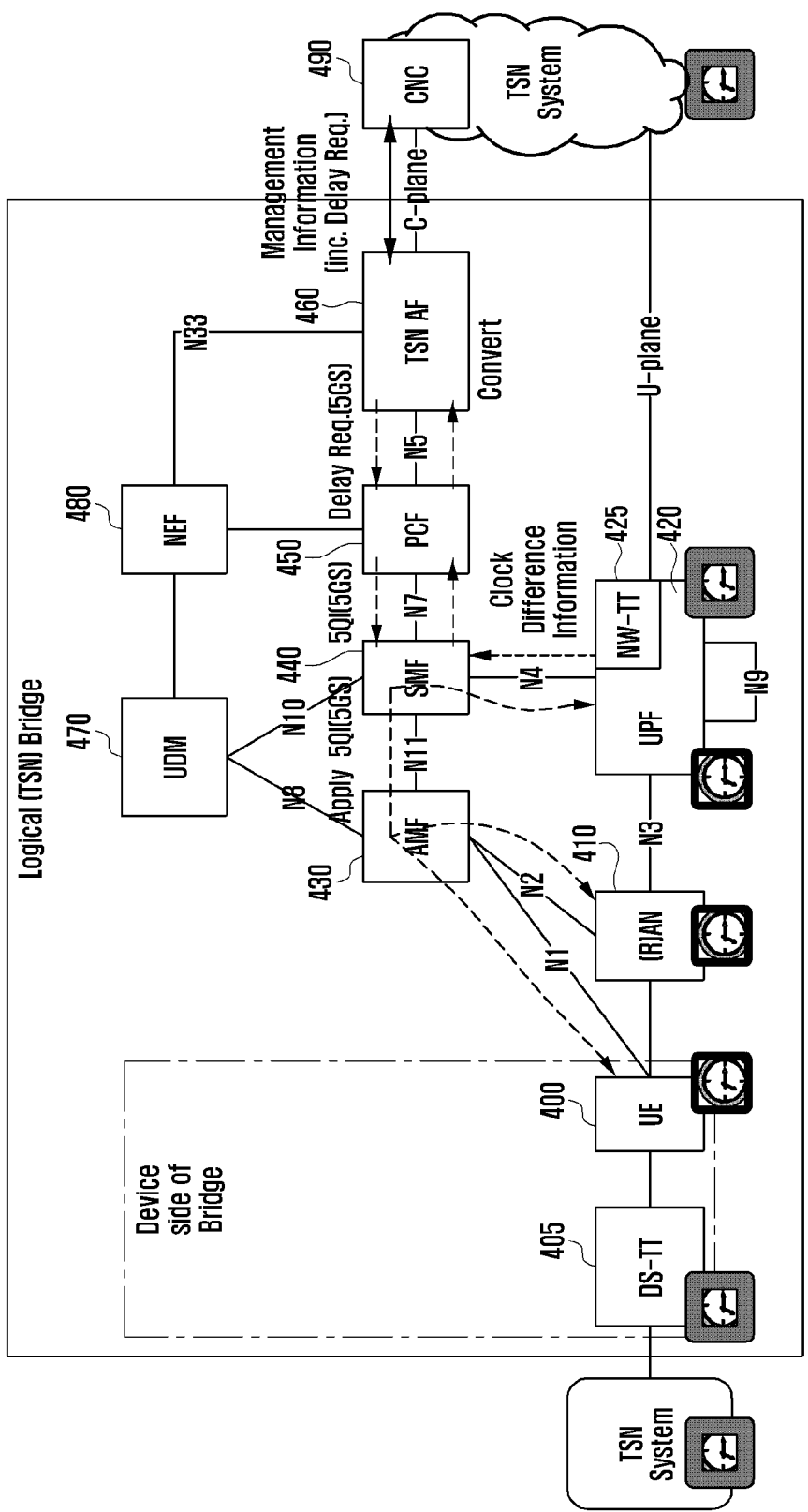
FIG. 4 is a conceptual diagram illustrating a method for converting a delay requirement by a time sensitive networking (TSN) application function (AF) according to an embodiment of the disclosure.

FIG. 4 is a conceptual diagram illustrating a method for converting a delay requirement by the TSN AF according to an embodiment of the disclosure.

The description of each entity 400 to 490 shown in FIG. 4 is the same as described in FIG. 2 above.

According to an embodiment of the disclosure in FIG. 4, when the SMF 440 receives difference information between the 5GS clock and the TSN clock from the UPF 420, it may forward the difference information to the PCF 450, and the PCF 450 may deliver the difference information to the TSN AF 460. The TSN AF 460 may convert the delay requirement for the TSC stream from a TSN clock basis to a 5GS clock basis based on the difference information. The TSN AF 460 may transmit the converted delay requirement to the PCF 450. The PCF 450 may determine a 5QI that meets the delay requirement converted based on the 5GS clock. The PCF may transmit the determined 5QI to the SMF, and the SMF may apply the QoS corresponding to the 5QI. Using the above-described method, it is possible to determine an optimal 5QI that satisfies the delay requirement. However, additional signaling may be generated to transmit the difference information between the 5GS clock and the TSN clock from the SMF 440 to the TSN AF 460 via the PCF 450.

Figure 5:
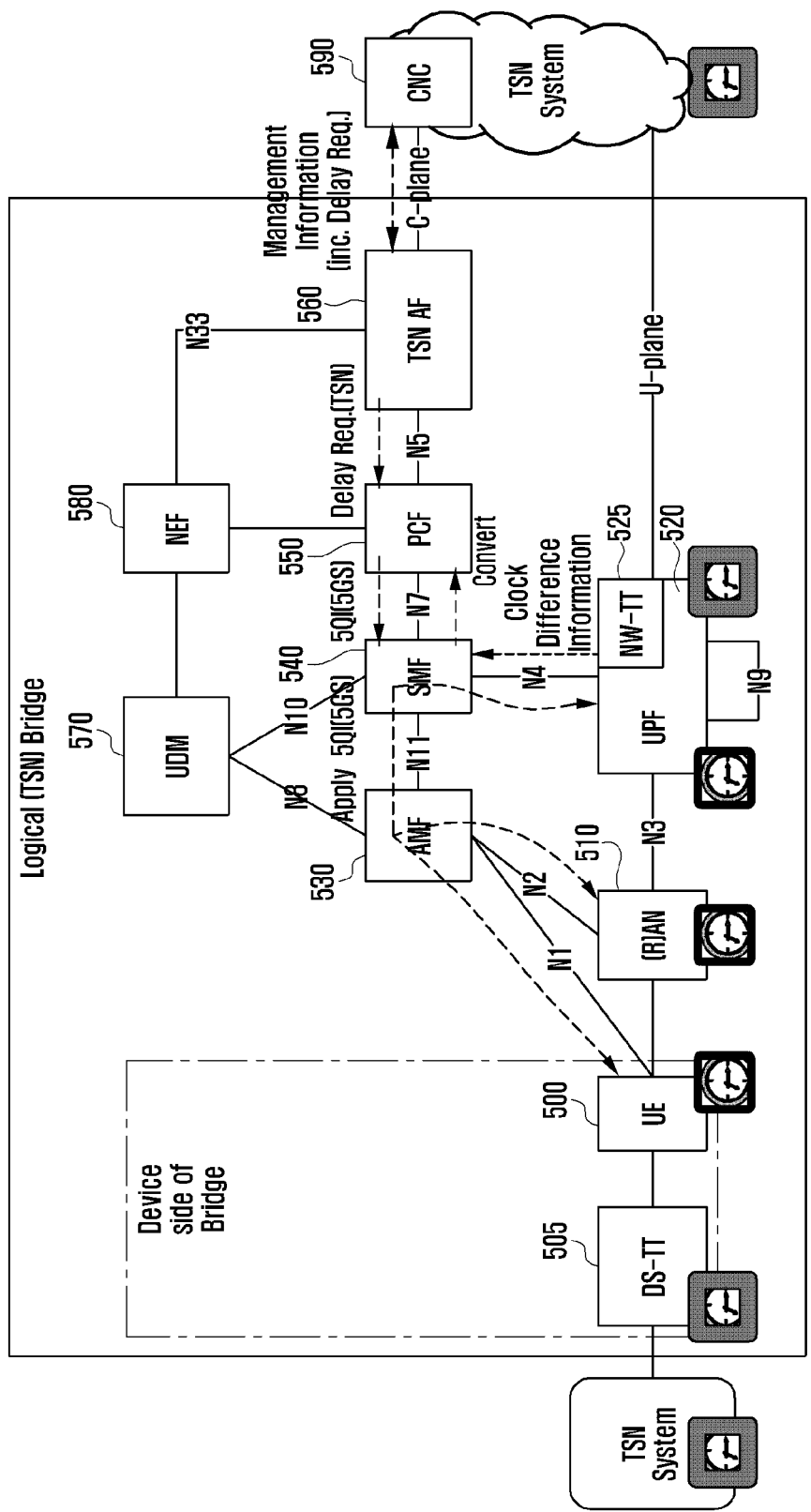
FIG. 5 is a conceptual diagram illustrating a method for converting a delay requirement by a policy control function (PCF) according to an embodiment of the disclosure.

FIG. 5 is a conceptual diagram illustrating a method for converting a delay requirement by the PCF according to an embodiment of the disclosure.

The description of each entity 500 to 590 shown in FIG. 5 is the same as described in FIG. 2 above.

According to an embodiment of the disclosure in FIG. 5, the SMF 540 may receive difference information between the 5GS clock and the TSN clock from the UPF 520, and may forward the clock information to the PCF 550. The TSN AF 560 may transmit a delay requirement based on the TSN clock to the PCF 550. The PCF 550 may convert the delay requirement into a 5GS clock-based delay requirement. The PCF 550 may determine a 5QI that satisfies the converted delay requirement. The PCF 550 may transmit the determined 5QI to the SMF 540. The SMF 540 applies the QoS corresponding to the 5QI. Using the above-described method, the 5GS can determine an optimal 5QI that satisfies the delay requirement. However, additional signaling may be generated to transfer the difference information between the 5GS clock and the TSN clock from the SMF 540 to the PCF 550.

Figure 6:
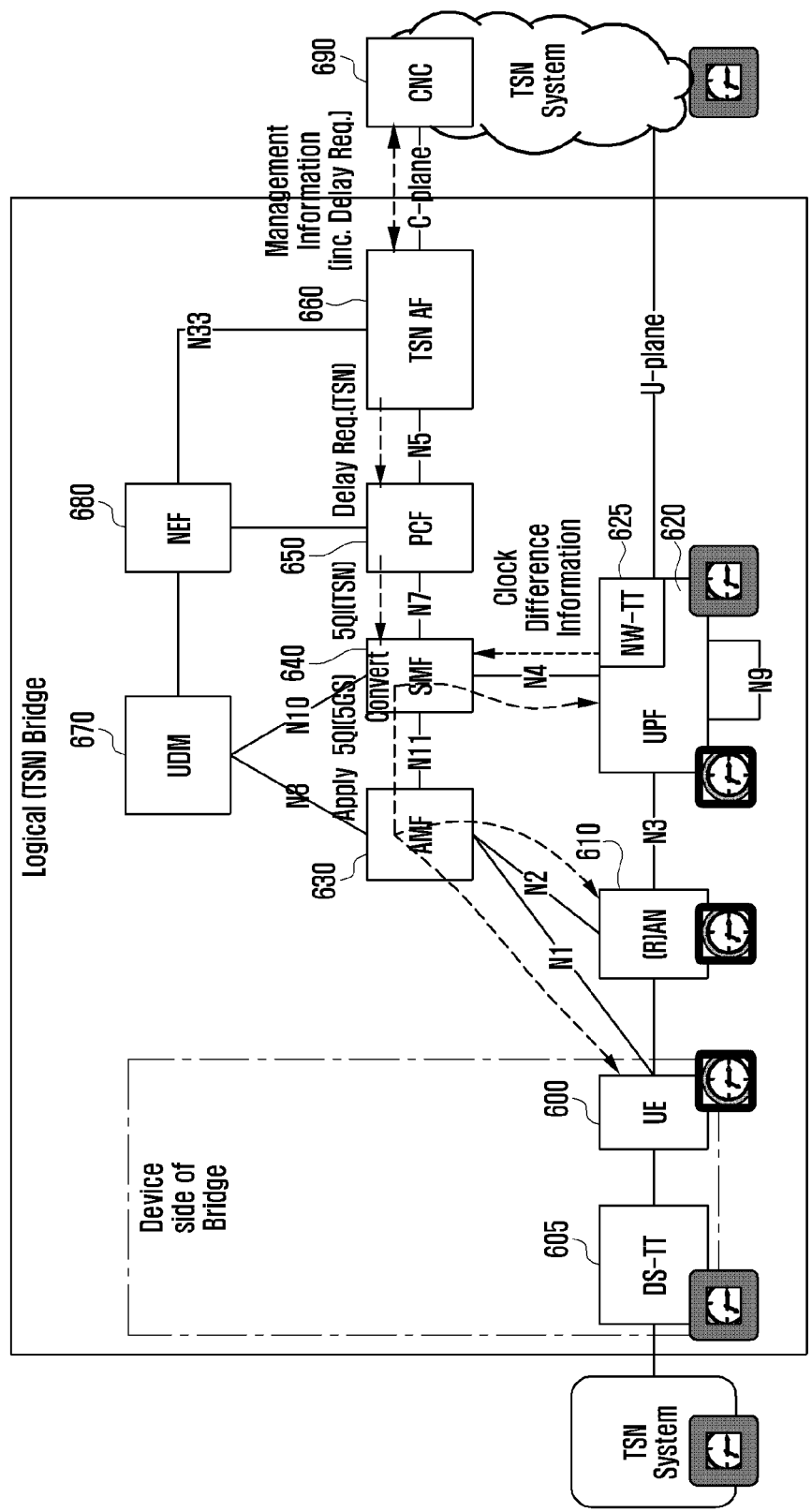
FIG. 6 is a conceptual diagram illustrating a method for converting a 5QI when necessary by the SMF according to an embodiment of the disclosure.

FIG. 6 is a conceptual diagram illustrating a method for converting a 5QI when necessary by the SMF according to an embodiment of the disclosure.

The description of each entity 600 to 690 shown in FIG. 6 is the same as described in FIG. 2 above.

According to an embodiment of the disclosure in FIG. 6, the TSN AF 660 may transmit a TSN clock-based delay requirement to the PCF 650. The PCF 650 may determine a 5QI that satisfies the delay requirement. The PCF 650 may transmit the determined 5QI to the SMF 640. Before applying the 5QI, the SMF 640 may determine a 5QI' converted based on the 5GS clock by using the rate ratio. The SMF 640 may determine a new 5QI based on the 5QI' and various criteria, or may use the existing 5QI as it is. When a 5QI update is required, the SMF 640 may perform a procedure for changing the 5QI on the PCF 650. According to an embodiment of the disclosure, the 5GS may select a 5QI that satisfies the delay requirement. In addition, since additional signaling load is not generated to transmit the difference information between the 5GS clock and the TSN clock from the SMF 640 to the PCF 650 or TSN AF 660, the overall system efficiency can be improved.

When a 5QI is newly determined based on the 5QI', various criteria may be applied. For example, when the maximum delay time of the 5QI' is greater than the maximum delay time of the 5QI, the existing 5QI may be used. In addition, when the maximum delay time of the 5QI' is less than the maximum delay time of the 5QI, the optimal one satisfying the maximum delay time of the 5QI' may be determined again among combinations of supportable 5QIs. Here, when the DS-TT-UE residence time described in FIG. 3 has a minimum and a maximum and adjustment is allowed between them, if the difference between the maximum delay time of the 5QI' and the maximum delay time of the 5QI can be compensated by using a margin between the minimum and maximum, the existing 5QI can be used as it is. Alternatively, if the difference between the maximum delay time of the 5QI' and the maximum delay time of the 5QI is less than or equal to a preset margin, the existing 5QI may be used as it is. The above margin can already be reflected in the process of sharing the 5GS bridge delay with the TSN CNC. Since the CNC determines a stream delivery path based on the margin and makes a delay request including the margin to the 5GS bridge on the determined path, the 5GS can guarantee the delay requirement. As another example, although the margin may cause a phenomenon that does not probabilistically satisfy the delay requirement, it may be applied to a case in which the message or packet loss of the TSC traffic due to this does not cause a problem at the application level. The maximum allowable time in which the application is not affected even if a message or packet transmitted in a preset periodicity is lost may be referred to as a survival time. The survival time may be determined according to the characteristics of each application. The survival time may be transmitted to the SMF 640 through the NEF 680 or operation administration and management (OAM) (not shown). The SMF 640 may determine the margin based on the survival time.

Figure 7:
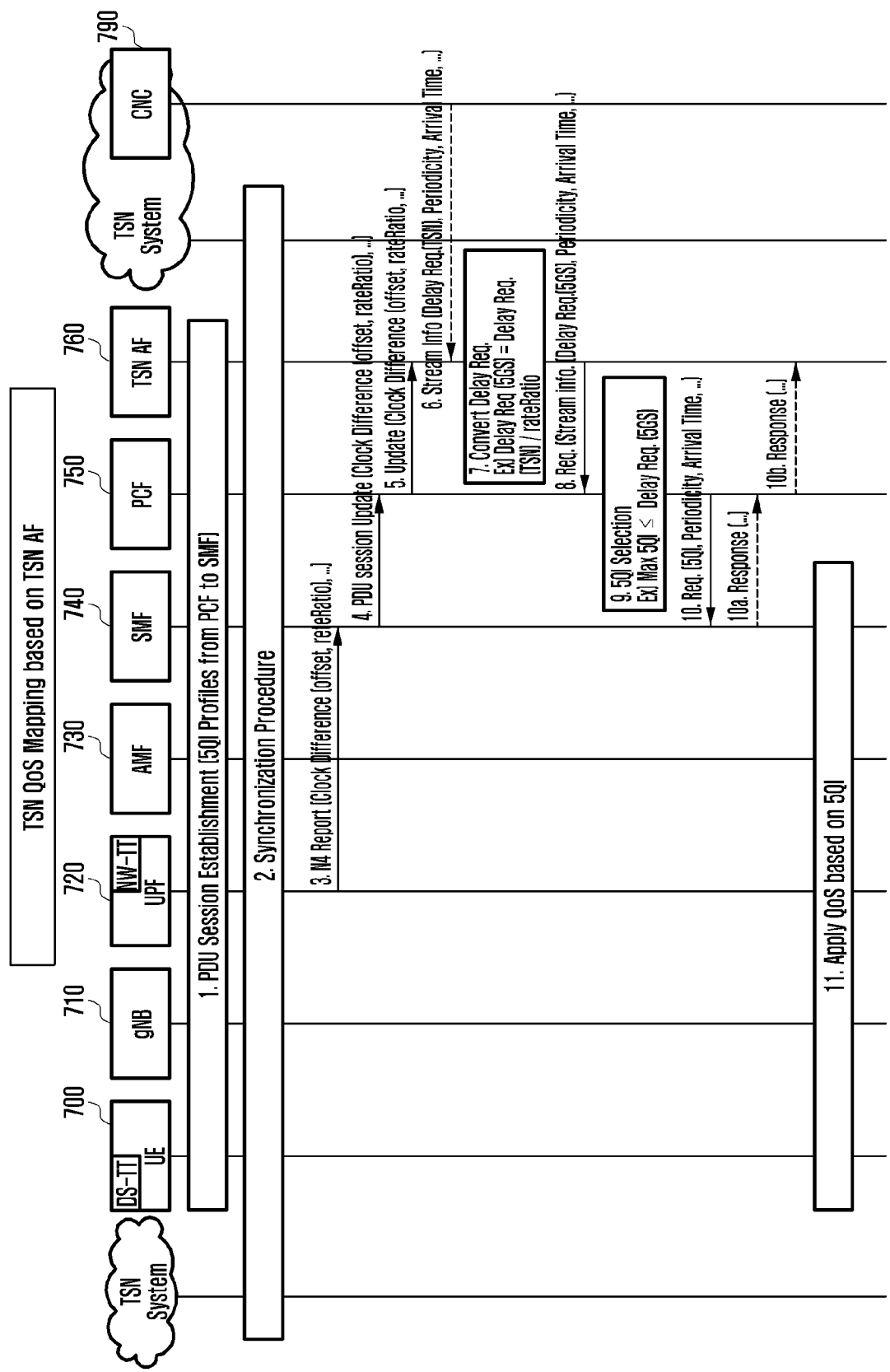
FIG. 7 is a sequence diagram illustrating an operation for the TSN AF to convert a delay requirement according to an embodiment of the disclosure.

FIG. 7 is a sequence diagram illustrating an operation for the TSN AF to convert a delay requirement according to an embodiment of the disclosure.

The description of each entity 700 to 790 shown in FIG. 7 is the same as described in FIG. 2 above. The operation of the embodiment of the disclosure according to FIG. 7 is based on what has been previously described with reference to FIG. 4.

At step 1, the UE 700 may create a PDU session supporting TSN. The 5QI profiles needed herein may be stored in the SMF 740.

At step 2, external TSN nodes and the 5GS bridge including the UE 700 and UPF 720 may transmit and receive clock synchronization Ethernet frames by using the PDU session to be synchronized with the TSN clock. After going through the above process, the UPF 720 may obtain TSN clock information in addition to the pre-stored 5GS clock information.

At step 3, the UPF 720 may transmit difference information between the 5GS clock and the TSN clock to the SMF 740. This difference information may include an offset and a rate ratio.

At step 4, the SMF 740 may transmit the difference information between the 5GS clock and the TSN clock to the PCF 750.

At step 5, the PCF 750 may transmit the difference information between the 5GS clock and the TSN clock further to the TSN AF 760.

At step 6, the TSN AF 760 may receive information about the stream from the CNC 790. The stream information may include scheduling information about the stream. The scheduling information may include a delay requirement.

At step 7, the TSN AF 760 may convert the TSN clock-based delay requirement into a 5GS clock-based delay requirement. In this process, the TSN AF 760 utilizes the difference information between the 5GS clock and the TSN clock obtained at step 5. In addition, the UE-DS-TT residence time obtained in steps 1 to 3 may also be considered.

At step 8, the TSN AF 760 may transmit the delay requirement based on the 5GS clock to the PCF 750.

At step 9, the PCF 750 may determine a 5QI that satisfies the delay requirement based on the 5GS clock.

At step 10, the PCF 750 may update the QoS setting rule for the SMF 740 by using the 5QI selected at step 9. Thereafter, the SMF 740 may respond to the PCF 750 with the updated result as in step 10a. Then, the PCF 750 may respond to the TSN AF 760 with the updated result as in step 10b.

At step 11, the SMF 740 may transmit QoS setting signaling reflecting the received 5QI to the UE 700/RAN 710/UPF 720 and apply the QoS.

Figure 8:
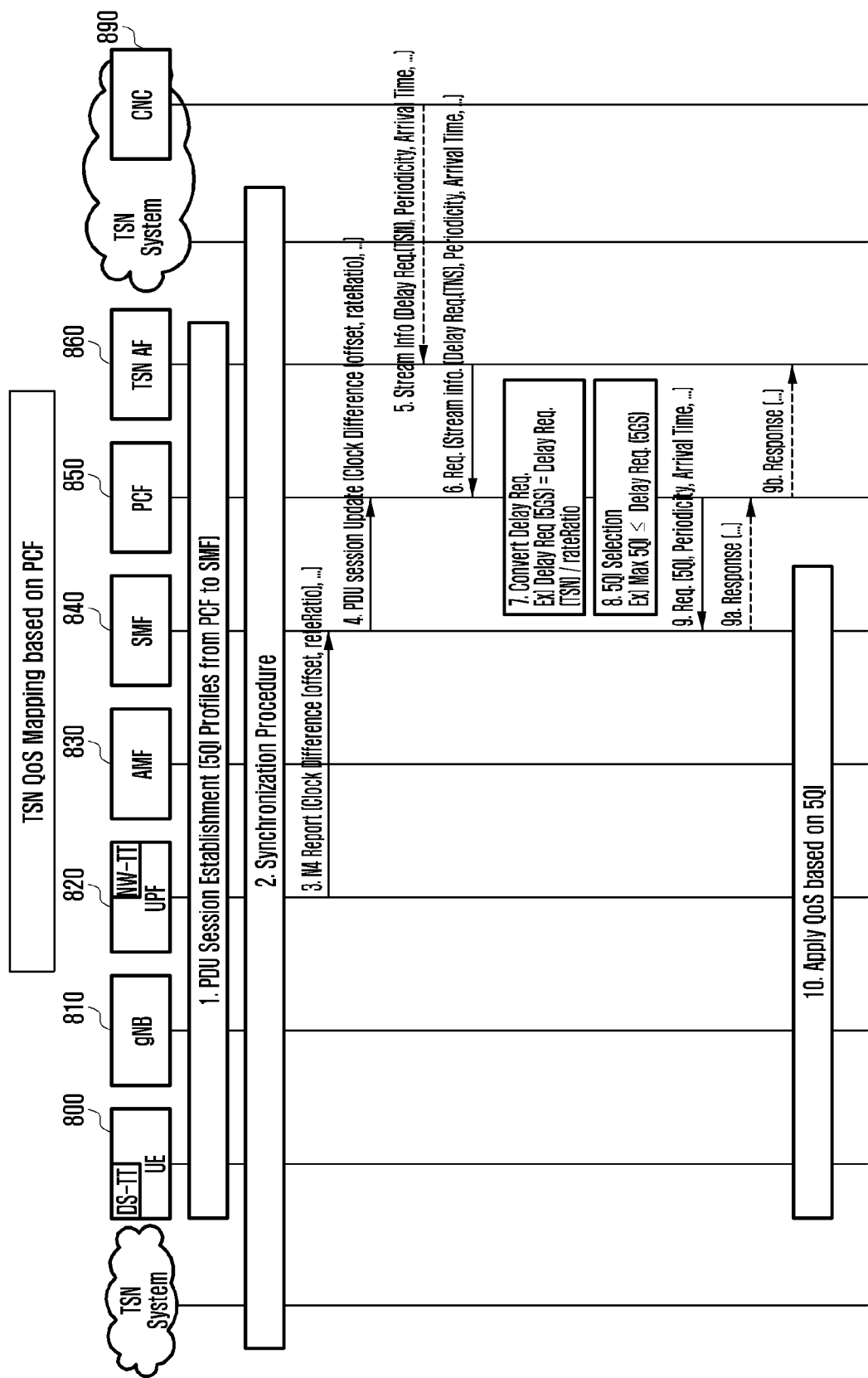
FIG. 8 is a sequence diagram illustrating an operation for the PCF to convert a delay requirement according to an embodiment of the disclosure.

FIG. 8 is a sequence diagram illustrating an operation for the PCF to convert a delay requirement according to an embodiment of the disclosure.

The description of each entity 800 to 890 shown in FIG. 8 is the same as described in FIG. 2 above. The operation of the embodiment of the disclosure according to FIG. 8 is based on what has been previously described with reference to FIG. 5.

At step 1, the UE 800 may create a PDU session supporting TSN. The 5QI profiles needed herein may be stored in the SMF 840.

At step 2, external TSN nodes and the 5GS bridge including the UE 800 and UPF 820 may transmit and receive clock synchronization Ethernet frames by using the PDU session to be synchronized with the TSN clock. After going through the above process, the UPF 820 may obtain TSN clock information in addition to the pre-stored 5GS clock information.

At step 3, the UPF 820 may transmit difference information between the 5GS clock and the TSN clock to the SMF 840. This difference information may include an offset and a rate ratio.

At step 4, the SMF 840 may transmit the difference information between the 5GS clock and the TSN clock to the PCF 850.

At step 5, the TSN AF 860 may receive information about the stream from the CNC 890. The stream information may include scheduling information about the stream. The scheduling information may include a delay requirement.

At step 6, the TSN AF 860 may transmit the delay requirement based on the TSN clock to the PCF 850. In the process of determining the delay requirement, the TSN AF 860 may also consider the UE-DS-TT residence time obtained at steps 1 to 3.

At step 7, the PCF 850 may convert the delay requirement based on the TSN clock into a delay requirement based on the 5GS clock.

At step 8, the PCF 850 may determine a 5QI that satisfies the 5GS clock-based delay requirement.

At step 9, the PCF 850 may update the QoS setting rule for the SMF 840 by using the 5QI selected at step 8. Thereafter, the SMF 840 may respond to the PCF 850 with the updated result as in step 9a. Then, the PCF 850 may respond to the TSN AF 860 with the updated result as in step 9b.

At step 10, the SMF 840 may transmit QoS setting signaling reflecting the received 5QI to the UE 800/RAN 810/UPF 820 and apply the QoS.

Figure 9:
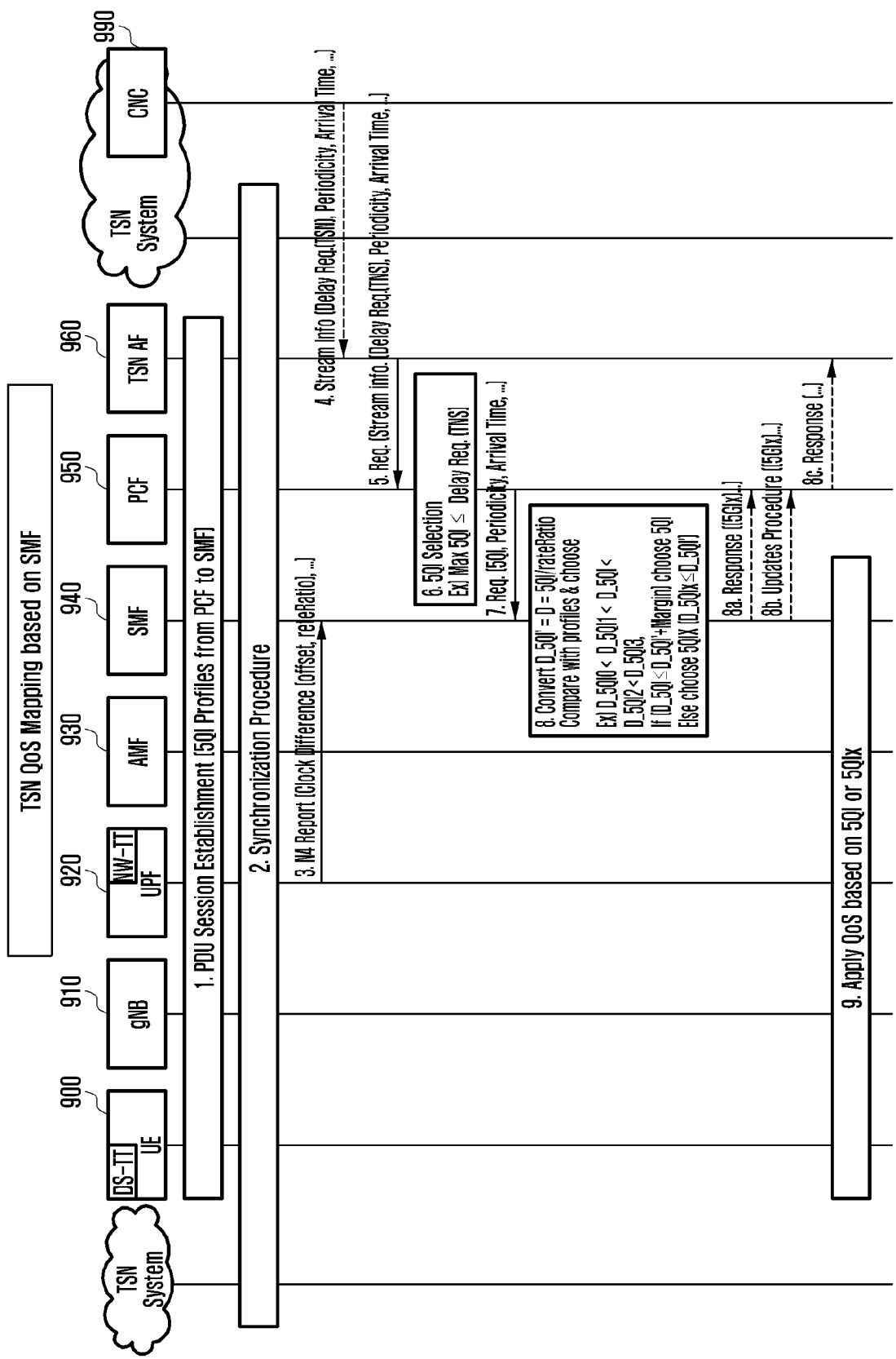
FIG. 9 is a sequence diagram illustrating an operation for the SMF to convert a 5QI when necessary according to an embodiment of the disclosure.

FIG. 9 is a sequence diagram illustrating an operation for the SMF to convert a 5QI when necessary according to an embodiment of the disclosure.

The description of each entity 900 to 990 shown in FIG. 9 is the same as described in FIG. 2 above. The operation of the embodiment of the disclosure according to FIG. 9 is based on what has been previously described with reference to FIG. 6.

At step 1, the UE 900 may create a PDU session supporting TSN. The 5QI profiles needed herein may be stored in the SMF 940.

At step 2, external TSN nodes and the 5GS bridge including the UE 900 and UPF 920 may transmit and receive clock synchronization Ethernet frames by using the PDU session to be synchronized with the TSN clock. After going through the above process, the UPF 920 may obtain TSN clock information in addition to the pre-stored 5GS clock information.

At step 3, the UPF 920 may transmit difference information between the 5GS clock and the TSN clock to the SMF 940. This difference information may include an offset and a rate ratio.

At step 4, the TSN AF 960 may receive information about the stream from the CNC 990. The stream information may include scheduling information about the stream. The scheduling information may include a delay requirement.

At step 5, the TSN AF 960 may transmit the delay requirement based on the TSN clock to the PCF 950. In the process of determining the delay requirement, the TSN AF 960 may also consider the UE-DS-TT residence time obtained at steps 1 to 3.

At step 6, the PCF 950 may determine a 5QI that satisfies the delay requirement based on the TSN clock.

At step 7, the PCF 950 may update the QoS setting rule for the SMF 940 by using the 5QI selected at step 6.

At step 8, the SMF 940 may convert the maximum delay value of the 5QI that satisfies the TSN clock-based delay requirement from a TSN clock basis to a 5GS clock basis.

A virtual 5QI value that satisfies the converted maximum delay value may be referred to as 5QI'. By comparing the maximum delay value D_5QI of 5QI and the maximum delay value D_5QI' of 5QI', the existing 5QI may be used or a new 5QI may be determined for usage depending on the case. For example, if D_5QI' is greater than D_5QI, the existing 5QI may be used; if D_5QI' is less than D_5QI, a 5QI having the maximum delay satisfying D_5QI' may be newly determined. For example, when D_5QI0<D_5QI1<D_5QI<D_5QI2<D_5QI3, if D_5QI<D_5QI'<D_5Q2, the 5QI may be used as before; otherwise, 5QIx satisfying D_5QIx<D_5QI' may be determined. Here, when the value of x is set to the maximum, the efficiency can be increased. Alternatively, if D_5QI' is greater than D_5QI-Margin, the existing 5QI may be used; otherwise, 5QIx satisfying D_5QIx<D_5QI' may be determined. Here, when the value of x is set to the maximum, the efficiency can be increased.

Thereafter, the SMF 940 may respond to the PCF 950 with the updated result as in step 8a. If the SMF 940 does not directly determine at step 8 and transmits an update request to the PCF 950 as in step 8b, the PCF 950 may determine again. Then, the PCF 950 may respond to the TSN AF 960 with the updated result as in step 8c.

At step 9, the SMF 940 may transmit QoS setting signaling reflecting the determined 5QI or 5QIx to the UE 900/RAN 910/UPF 920 and apply the QoS.

Figure 10:
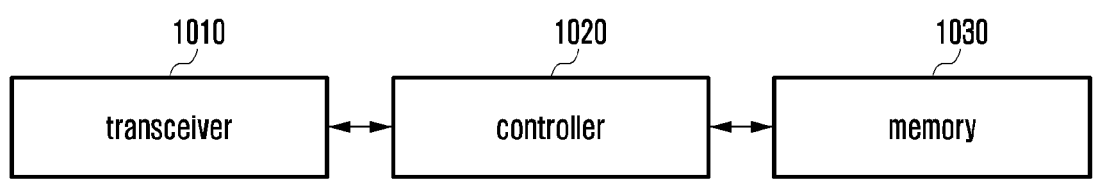
FIG. 10 is a diagram illustrating the structure of a terminal according to an embodiment of the disclosure.

FIG. 10 is a diagram illustrating the structure of a user equipment according to an embodiment of the disclosure.

With reference to FIG. 10, the user equipment (UE) may include a transceiver 1010, a controller 1020, and a memory 1030. The UE may include more components according to the implementation method. For example, the UE may further include various additional devices such as a display for a user interface, an input unit, and a sensor. In the disclosure, no restrictions are placed on such additional components.

The transceiver 1010 may be connected to a base station through a radio channel based on each of the embodiments described in FIGS. 1 to 9, and may transmit and receive signals and/or messages to and from various network functional entities through the base station. When the UE communicates with a 5G network, the transceiver 1010 may be a device capable of transmit and receiving to and from a 5G communication network. In addition, the transceiver 1010 may include a communication processor as necessary.

When the transceiver 1010 does not include a communication processor, all signals and/or messages may be processed by the controller.

The controller 1020 may control the basic operation of the UE, and may control reception and storage of the messages described above. In addition, the controller 1020 may perform control for transmitting or receiving data through a specific network slice. For example, the controller 1020 may perform an operation based on the UE's policy as described above.

The memory 1030 may store various data necessary for controlling the UE, and may have a region for storing the above-described UE policy.

Figure 11:
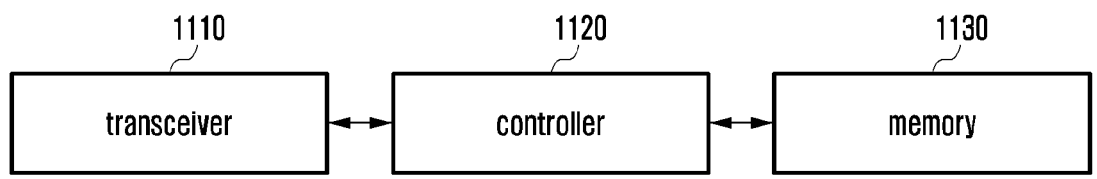
FIG. 11 is a diagram illustrating the structure of a base station according to an embodiment of the disclosure.

FIG. 11 is a diagram illustrating the structure of a base station according to an embodiment of the disclosure.

With reference to FIG. 11, the base station (gNB) may include a transceiver 1110, a controller 1120, and a memory 1130. The gNB may include more components according to the implementation method. For example, the gNB may further include various additional devices such as a display for a user interface, an input unit, and a sensor. In the disclosure, no restrictions are placed on such additional components.

The transceiver 1110 may be connected to a UE through a radio channel based on each of the embodiments described in FIGS. 1 to 9, and may transmit and receive signals and/or messages to and from various network functional devices (e.g., entities) through a wired interface. When the gNB communicates with a 5G network, the transceiver 1110 may be a device capable of transmit and receiving to and from a 5G communication network. In addition, the transceiver 1110 may include a communication processor as necessary.

In case that the transceiver 1110 does not include a communication processor, all signals and/or messages may be processed by the controller.

The controller 1120 may control the basic operation of the gNB, and may control reception and storage of the messages described above. In addition, the controller 1120 may perform control for transmitting or receiving data through a specific network slice. For example, the controller 1120 may perform an operation based on the gNB's policy as described above.

The memory 1130 may store various data necessary for controlling the gNB, and may have a region for storing the above-described UE policy.

Figure 12:
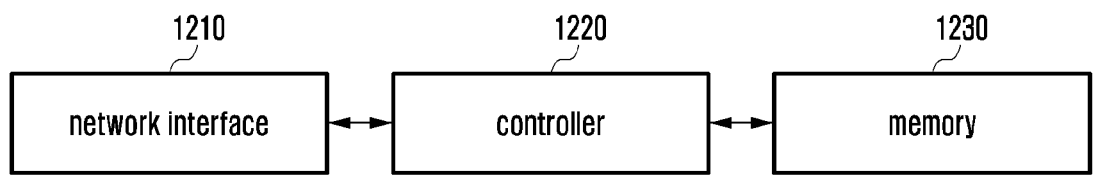
FIG. 12 is a diagram illustrating the structure of an SMF entity according to an embodiment of the disclosure.

FIG. 12 is a diagram illustrating the structure of an SMF entity according to an embodiment of the disclosure.

With reference to FIG. 12, the SMF entity may communicate with other network entities in the core network through a network interface 1210. For example, the SMF entity may communicate with a UE, a gNB, a UPF entity, an AMF entity, a PCF entity, a TSN AF entity, and the like.

The controller 1220 may be implemented with at least one processor and/or a program for performing an operation of the SMF entity. For example, the controller 1220 may perform operations of the SMF entity according to various embodiments of the disclosure.

For example, the controller 1220 may convert between the 5GS clock and the TSN clock based on the delay requirement according to an embodiment of the disclosure.

The memory 1230 may store programs and various control information required by the controller 1220, and may store individual pieces of information described in the disclosure. The memory 1230 may store information necessary for the above-described operation in the same way even in the case of other network entities.

In addition to the configuration described above, the SMF entity may further include various interfaces for connection with the operator. In the disclosure, there is no particular limitation on such an additional configuration.

Figure 13:
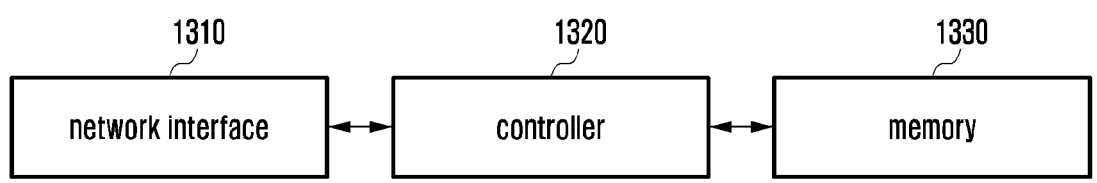
FIG. 13 is a diagram illustrating the structure of a PCF entity according to an embodiment of the disclosure.

FIG. 13 is a diagram illustrating the structure of a PCF entity according to an embodiment of the disclosure.

With reference to FIG. 13, the PCF may communicate with other network entities of the core network through the network interface 1310. For example, the PCF entity may communicate with a UE, a gNB, a UPF entity, an AMF entity, an SMF entity, a TSN AF entity, and the like.

The controller 1320 may be implemented with at least one processor and/or a program for performing an operation of the PCF entity. For example, the controller 1320 may perform operations of the PCF entity according to various embodiments of the disclosure.

For example, the controller 1320 may convert between the 5GS clock and the TSN clock based on the delay requirement according to an embodiment of the disclosure.

The memory 1330 may store programs and various control information required by the controller 1320, and may store individual pieces of information described in the disclosure. The memory 1330 may store information necessary for the above-described operation in the same way even in the case of other network entities.

In addition to the configuration described above, the PCF entity may further include various interfaces for connection with the operator. In the disclosure, there is no particular limitation on such an additional configuration.

Figure 14:
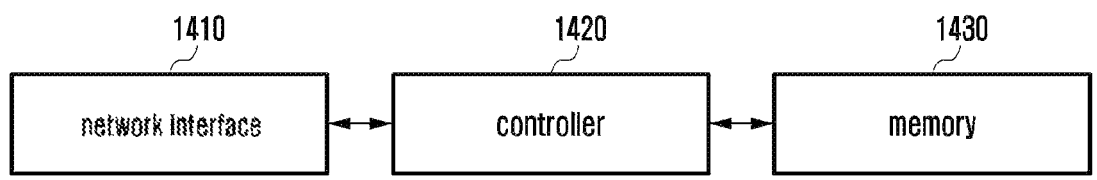
FIG. 14 is a diagram illustrating the structure of a TSN AF entity according to an embodiment of the disclosure.

FIG. 14 is a diagram illustrating the structure of a TSN AF entity according to an embodiment of the disclosure.

The TSN AF may communicate with other network entities of the core network through the network interface 1410. For example, the TSN AF entity may communicate with a UE, a gNB, a UPF entity, an AMF entity, an SMF entity, a PCF entity, and the like.

The controller 1420 may be implemented with at least one processor and/or a program for performing an operation of the TSN AF entity. For example, the controller 1420 may perform operations of the TSN AF entity according to various embodiments of the disclosure.

For example, the controller 1420 may convert between the 5GS clock and the TSN clock based on the delay requirement according to an embodiment of the disclosure.

The memory 1430 may store programs and various control information required by the controller 1420, and may store individual pieces of information described in the disclosure. The memory 1430 may store information necessary for the above-described operation in the same way even in the case of other network entities.

In addition to the configuration described above, the TSN AF entity may further include various interfaces for connection with the operator. In the disclosure, there is no particular limitation on such an additional configuration.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium are configured to be executable by one or more processors of an electronic device. The one or more programs include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EE-PROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide area network (WAN), or a storage area network (SAN), or a communication network composed of a combination of these. Such a storage device may access the device that carries out an embodiment of the disclosure through an external port. In addition, a separate storage device on a communication network may access the device that carries out an embodiment of the disclosure.

In the specific embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, although specific embodiments have been described in the detailed description of the disclosure, various modifications are possible without departing from the scope of the disclosure. Therefore, the scope of the present disclosure should not be limited to the described embodiments but should be defined by the appended claims and their equivalents.

The invention claimed is:

1. A method of an application function (AF) entity for a time sensitive communication (TSC) in a wireless communication system, the method comprising:
    obtaining first delay information for a time sensitive network (TSN);
    obtaining second delay information for a 5th generation system (5GS); and
    transmitting, to a policy control function (PCF) entity, a request for a quality-of-service (QoS) based on the first delay information and the second delay information, wherein a first delay requirement associated with the first delay information is converted to second delay requirement associated with the second delay information based on a difference in a delay time.

2. The method of claim 1, wherein the request includes a set of requirements for the difference in the delay time associated with the first delay information and the second delay information.

3. The method of claim 1, further comprising updating a QoS policy based on the request.

4. A method of a policy control function (PCF) entity for a time sensitive communication (TSC) in a wireless communication system, the method comprising:
    obtaining first delay information for a 5th generation system (5GS);
    transmitting the first delay information to an application function (AF) entity;
    obtaining, from the AF entity, a request for a quality-of-service (QOS) based on the first delay information and second delay information, wherein the second delay information is associated with a time sensitive network (TSN) and a first delay requirement associated with the first delay information is converted to second delay requirement associated with the second delay information based on a difference in a delay time; and
    determining a QoS policy based on the request.

5. The method of claim 4, wherein the request includes a set of requirements for the difference in the delay time associated with the first delay information and the second delay information.

6. The method of claim 4, further comprising updating the determined QoS policy for a session management function (SMF) entity.

7. An application function (AF) entity for a time sensitive communication (TSC) in a wireless communication system, comprising:
    a transceiver; and
    at least one controller operably coupled to the transceiver, the at least one controller configured to:
        obtain first delay information for a time sensitive network (TSN),
        obtain second delay information for a 5th generation system (5GS), and
        transmit, to a policy control function (PCF) entity, a request for a quality-of-service (QoS) based on the first delay information and the second delay information, wherein a first delay requirement associated with the first delay information is converted to second delay requirement associated with the second delay information based on a difference in a delay time.

8. The AF entity of claim 7, wherein the request includes a set of requirements for the difference in the delay time associated with the first delay information and the second delay information.

9. The AF entity of claim 7, wherein the at least one controller is further configured to update a QoS policy based on the request.

10. A policy control function (PCF) entity for a time sensitive communication (TSC) in a wireless communication system, comprising:
    a transceiver; and
    at least one controller operably coupled to the transceiver, the at least one controller configured to:
        obtain first delay information for a 5th generation system (5GS),
        transmit the first delay information to an application function (AF) entity,
        obtain, from the AF entity, a request for a quality-of-service (QOS) based on the first delay information and second delay information, wherein the second delay information is associated with a time sensitive network (TSN) and a first delay requirement associated with the first delay information is converted to second delay requirement associated with the second delay information based on a difference in a delay time, and
        determine a QoS policy based on the request.

11. The PCF entity of claim 10, wherein the request includes a set of requirements for the difference in the delay time associated with the first delay information and the second delay information.

12. The PCF entity of claim 10, wherein the at least one controller is further configured to update the determined QoS policy for a session management function (SMF) entity.

* * * * *